United States Patent
Reis et al.

[11] Patent Number: 5,340,237
[45] Date of Patent: Aug. 23, 1994

[54] GUIDE-POST INTERCHANGEABILITY MECHANISM OPERATED BY REMOTELY CONTROLLED VEHICLE

[75] Inventors: Ney Robinson S. d. Reis; Fábio K. P. Conti, both of Rio de Janeiro, Brazil

[73] Assignee: Petroleo Brasileiro S.A., Rio de Janeiro, Brazil

[21] Appl. No.: 971,240

[22] Filed: Nov. 4, 1992

[30] Foreign Application Priority Data

Nov. 5, 1991 [BR] Brazil .................. PI 9104817

[51] Int. Cl.$^5$ .................. E02D 5/62; B63C 11/10
[52] U.S. Cl. .................. 405/169; 405/190; 405/195.1; 405/224.2; 405/223.1
[58] Field of Search ............ 405/169, 190, 204, 224.2, 405/224, 223.1, 195.1

[56] References Cited

U.S. PATENT DOCUMENTS

| | | | |
|---|---|---|---|
| 4,701,074 | 10/1987 | Hall | 405/190 X |
| 4,789,271 | 12/1988 | Sullaway et al. | 405/169 X |
| 4,797,029 | 1/1989 | Cowan et al. | 405/169 X |
| 4,867,605 | 9/1989 | Myers et al. | 405/169 |
| 4,877,356 | 10/1989 | Bontenbal | 405/169 |
| 4,881,850 | 11/1989 | Abreo, Jr. | 405/169 |
| 5,074,717 | 12/1991 | Hope et al. | 405/169 X |
| 5,143,483 | 9/1992 | Petersen | 405/169 X |
| 5,163,782 | 11/1992 | Paulo | 405/169 |

OTHER PUBLICATIONS

SPE (Society of Petroleum Engineers), Oct. 14–19, 1990; Jose Rebeschini and Jayme Hirotugo Ogura: "Reusable Permanent Guide Base for Guideline System and Bending Troubles in Wellhead System".

*Primary Examiner*—Randolph A. Reese
*Assistant Examiner*—J. Russell McBee
*Attorney, Agent, or Firm*—Sughrue, Mion, Zinn, Macpeak & Seas

[57] ABSTRACT

This invention concerns a mechanism for the interchanging of guide-posts worked by remotely controlled vehicle which consists of guide-cones (6) provided in the side of base beam (2) that supports socket (4) of guide-post, which guide-cones are placed axially and enter all around the socket (4) of guide-post, to create an operating channel inside the socket (4) while guide-post (8) is provided with a channel all around its bottom (1) to house a locking-pin (12). Guide-post (8) is placed inside its respective socket (4) so that the operating channel created by the guide cones (6) inside socket (4) matches channel all round the bottom (10) of socket, exactly, so that locking of guide-post (8) takes place by means of turning the locking-pin (12) housed in channel all around (10) the guide-post (8) by means of a remotely operated vehicle or suitable tool.

7 Claims, 6 Drawing Sheets

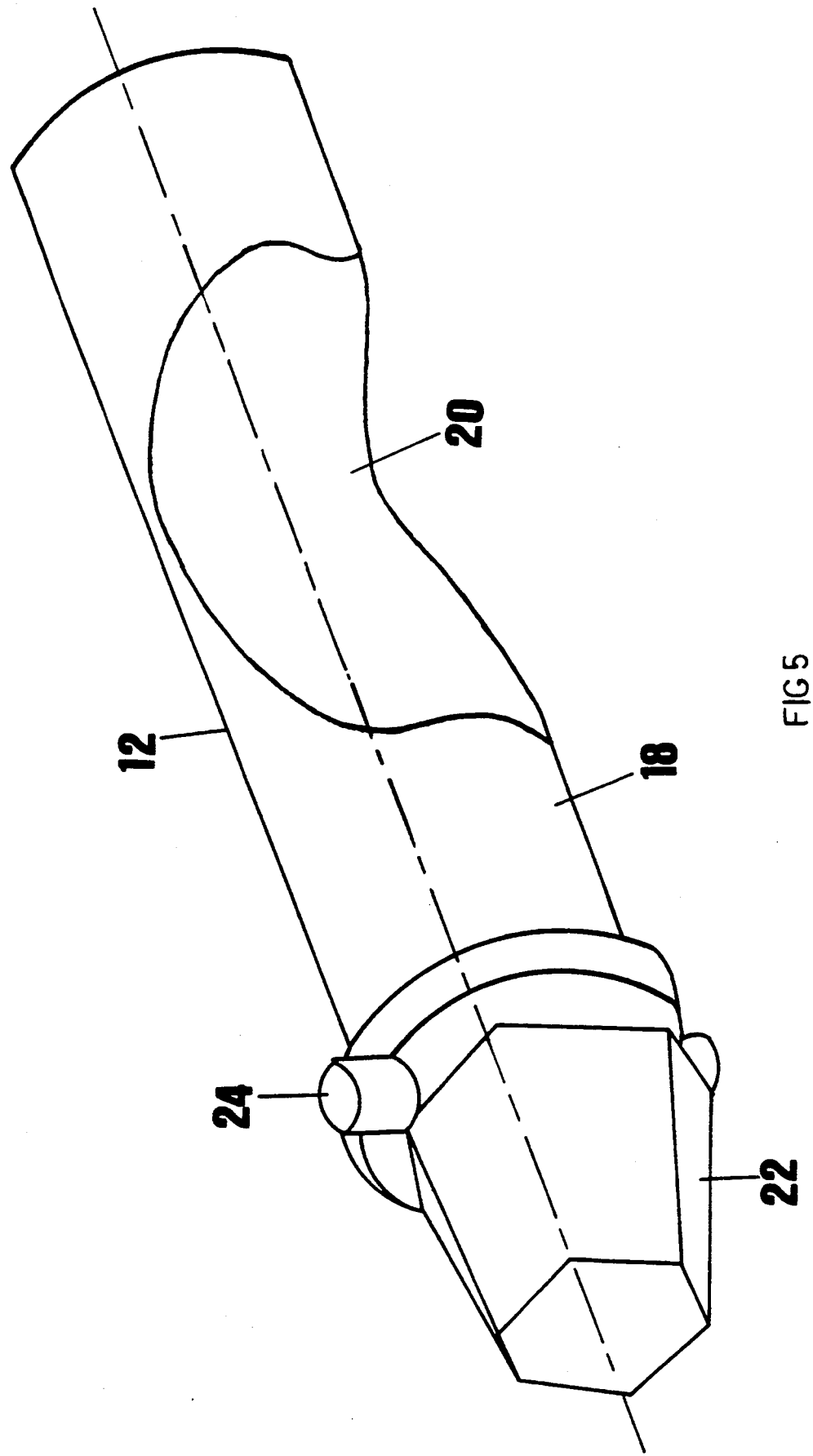

GUIDE-POST INTERCHANGEABILITY MECHANISM OPERATED BY REMOTELY CONTROLLED VEHICLE

FIELD OF INVENTION

This invention concerns a post-guide interchangeability mechanism operated by a remotely controlled vehicle, thepurpose being to provide undersea modular equipment with a really interchangeable post-guide system, which mechanism may be used for other kinds of fastening whenever an easy, swift and efficient way of unlocking the post-guide or other components as a whole is wanted.

DESCRIPTION OF PRIOR ART

One of the biggest problems in the undersea oil drilling business, particularly when this takes place at great depths, is that connected with designing guides to take and line up production modules. One of these guides, installed in temporary guide-beds, manifolds, BOP's and others, is the guide-post.

Not so long ago, when installing was done with the help of divers, if a post accidentally broke down or seized, the answer was to take it out by loosening the four bolts holding it to its bed flange, and then put in and screw down another post to the same flange.

A fresh generation of guide-posts was ushered in to deal with installing that could not be done by divers. Such was the system put forward at the SPE (Society of Petroleum Engineers) in 1990, known as Reusable Permanent Guide Base for Guideline System and Bending Troubles in Wellhead System", by José Rebeschini and Jayme Hirotugo Ogura of Petrobras, whereby the bottom part of the guide-post is provided with J-slots to take the post. GL4 mandrel sections at the top of the post enable a remote connector to be used so that a guide-line of up to 1¼" (3.2 cms) in diameter can be fixed to it, while a mechanical tool can also be used to recover the post. If post becomes bent, a bar inserted into holes in the body of the post with the aid of a remotely controlled vehicle—R.O.V.—enables the guide-post to be recovered with the aid of the drill stem and wirelines attached to the bar. There is also a way of locking the post into its socket, so as to make drilling at the template easier whenever the post has to be changed with the aid of the remotely controlled vehicle.

Although this system has been a big step forward in dealing with installing work where divers cannot be used, the fact is that any of the known systems are not really practical, nor efficient, and they are vulnerable.

SUMMARY OF INVENTION

To find an answer to these problems this invention concerns a guide-post interchanging mechanism worked by a remotely controlled vehicle that provides modular equipment, whether or not installed in deep water, with a really interchangeable guide-post system, which can be used for other kinds of attaching whenever an easy, swift and efficient way of unlocking posts or other components as a whole is wanted.

This is achieved with the aid of guide-post interchanging mechanism which is worked by a remotely controlled vehicle that consists of a base beam to support the guide-post, socket provided in its side with axially placed guide cones which penetrate the periphery of the guide-post socket, thus creating an operating channel inside the socket, while the bottom of guide-post is provided with a channel around its circumference which houses a locking pin. The guide-post stands in its socket in such a way that the operating channel inside the socket matches the channel around its bottom exactly, locking of guide-post being achieved by twisting the locking pin lying in said channel around the guide post with the aid of a remotely controlled vehicle or other suitable tool.

BRIEF DESCRIPTION OF DRAWINGS

The invention will now be described in greater detail with the aid of the drawings attached hereto, where:

FIG. 5 an enlarged perspective view of the locking-pin with a six-sided kind of operating interface

DETAILED DESCRIPTION OF INVENTION

Figure 1:
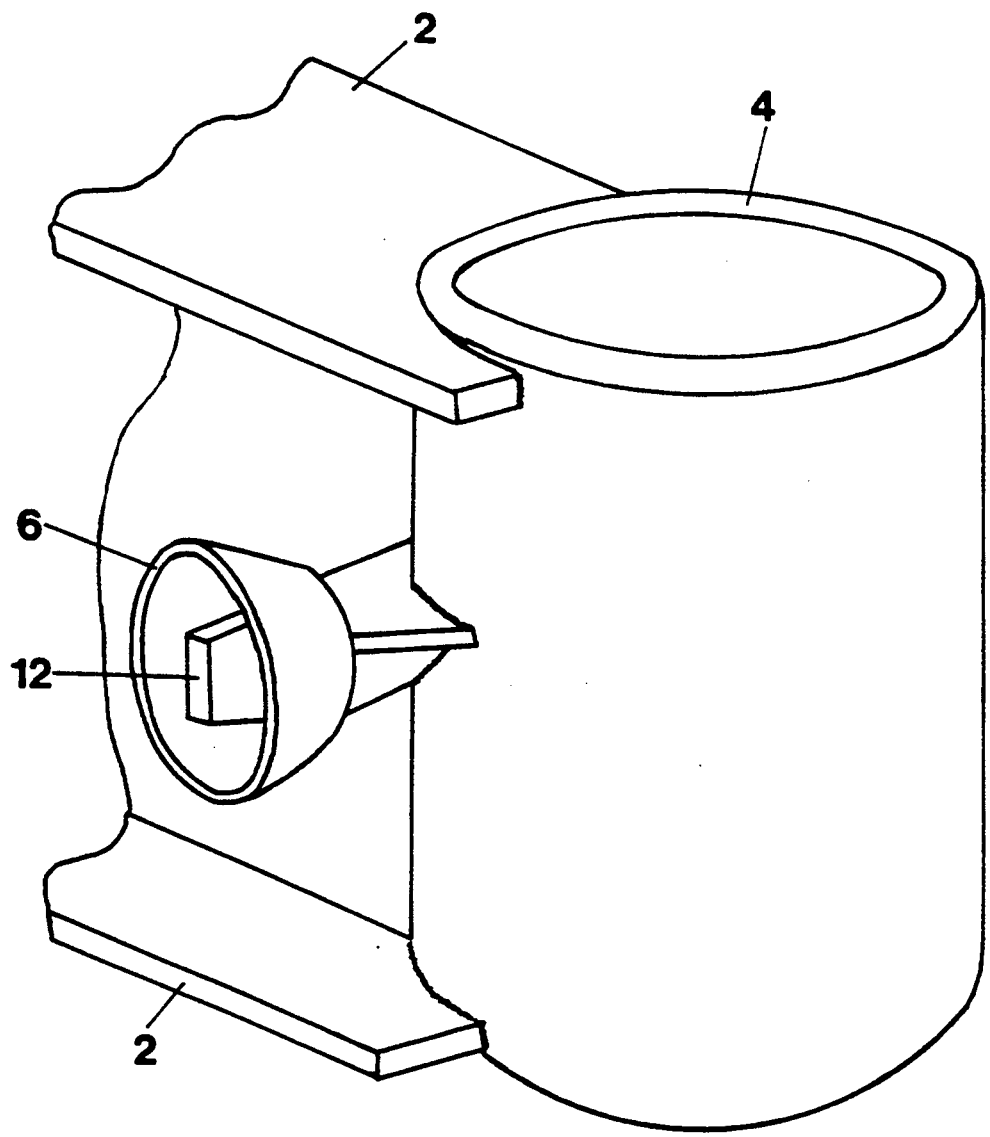
FIG. 1 is a perspective view of the outside and the interface of guide-post interchanging mechanism worked by a remotely controlled vehicle.
Figure 2:
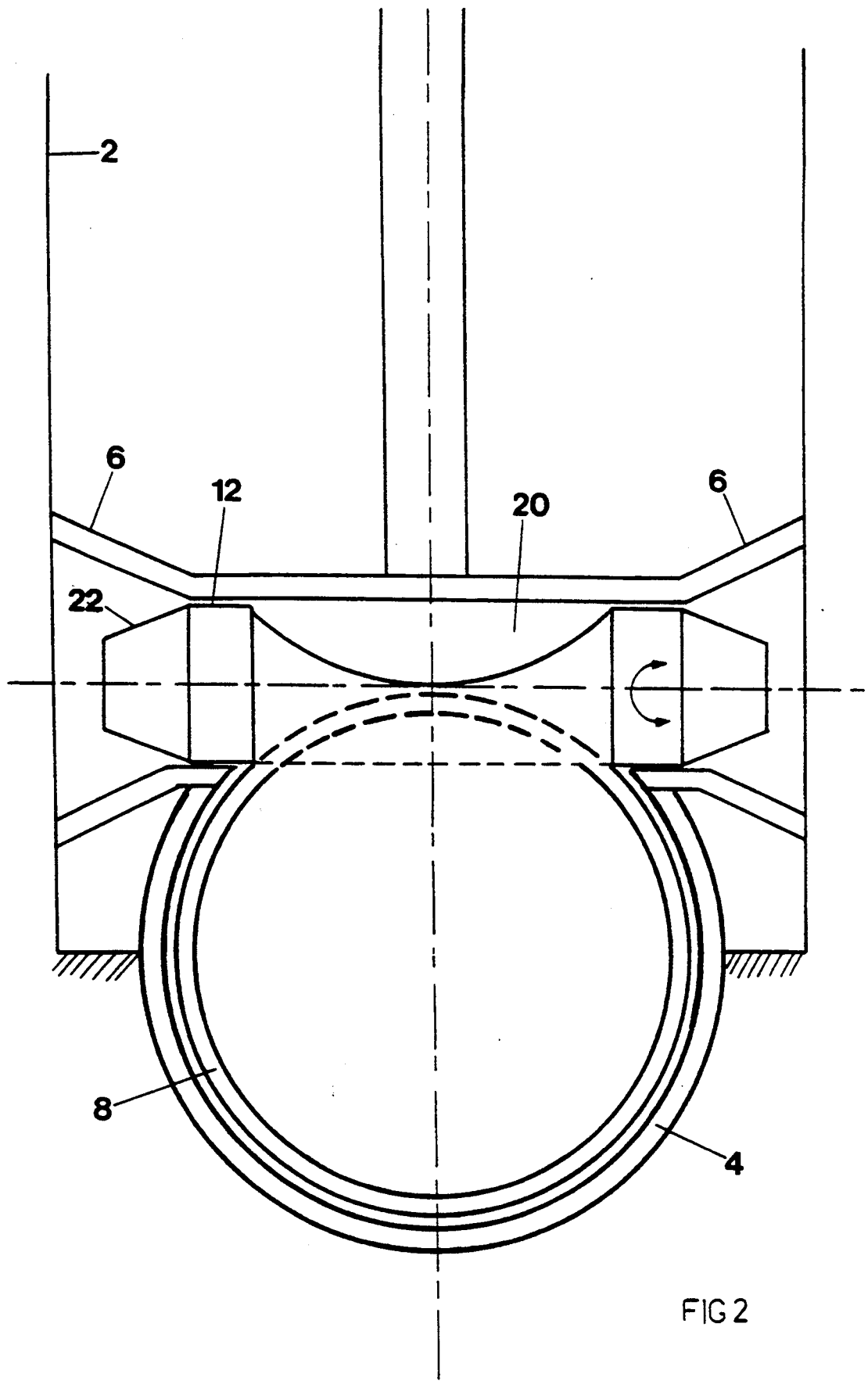
FIG. 2 is an enlarged plan view of the mechanism
Figure 3:
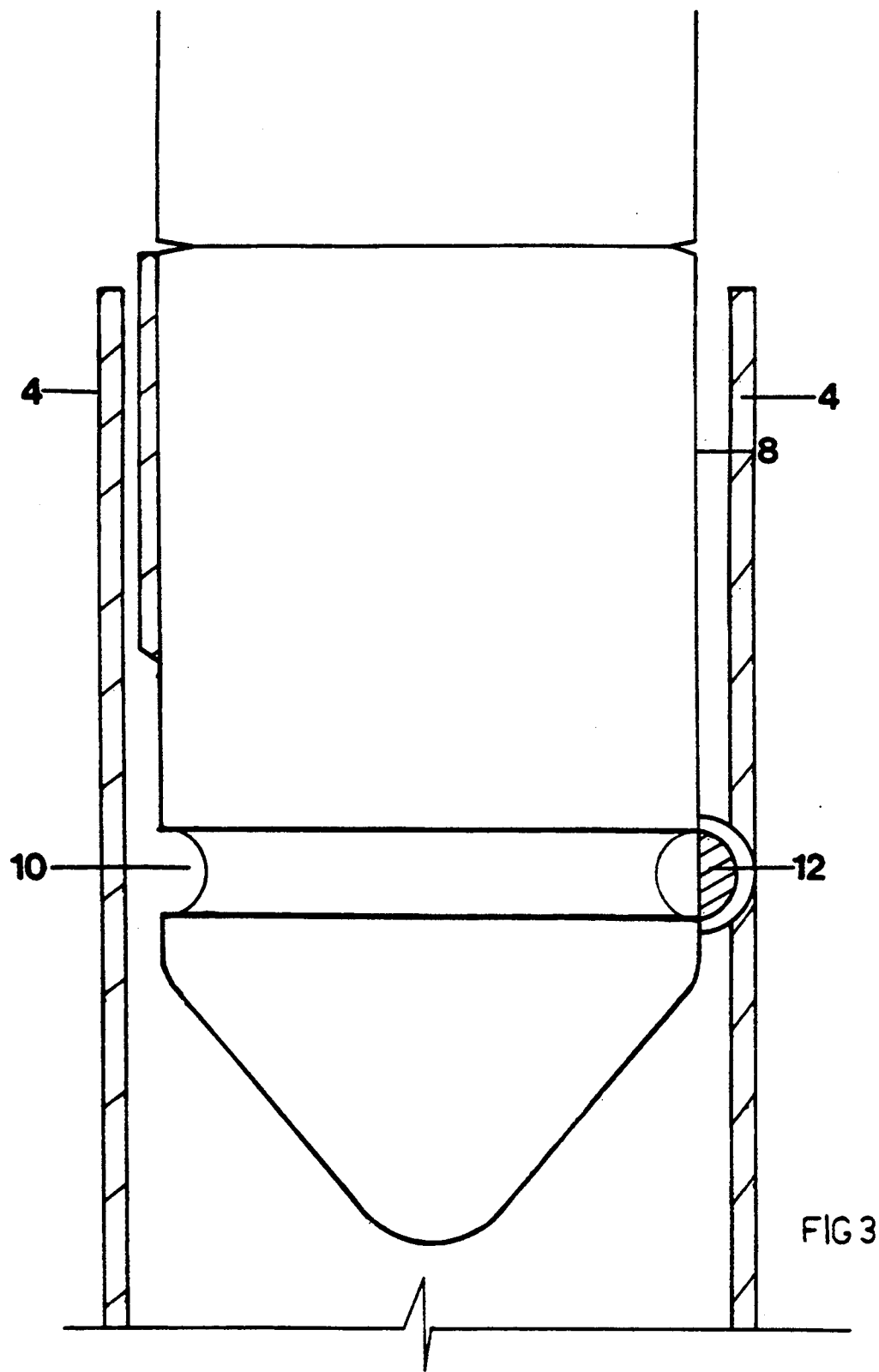
FIG. 3 is an enlarged vertical section view of guide-post locked into guide-bed.
Figure 4:
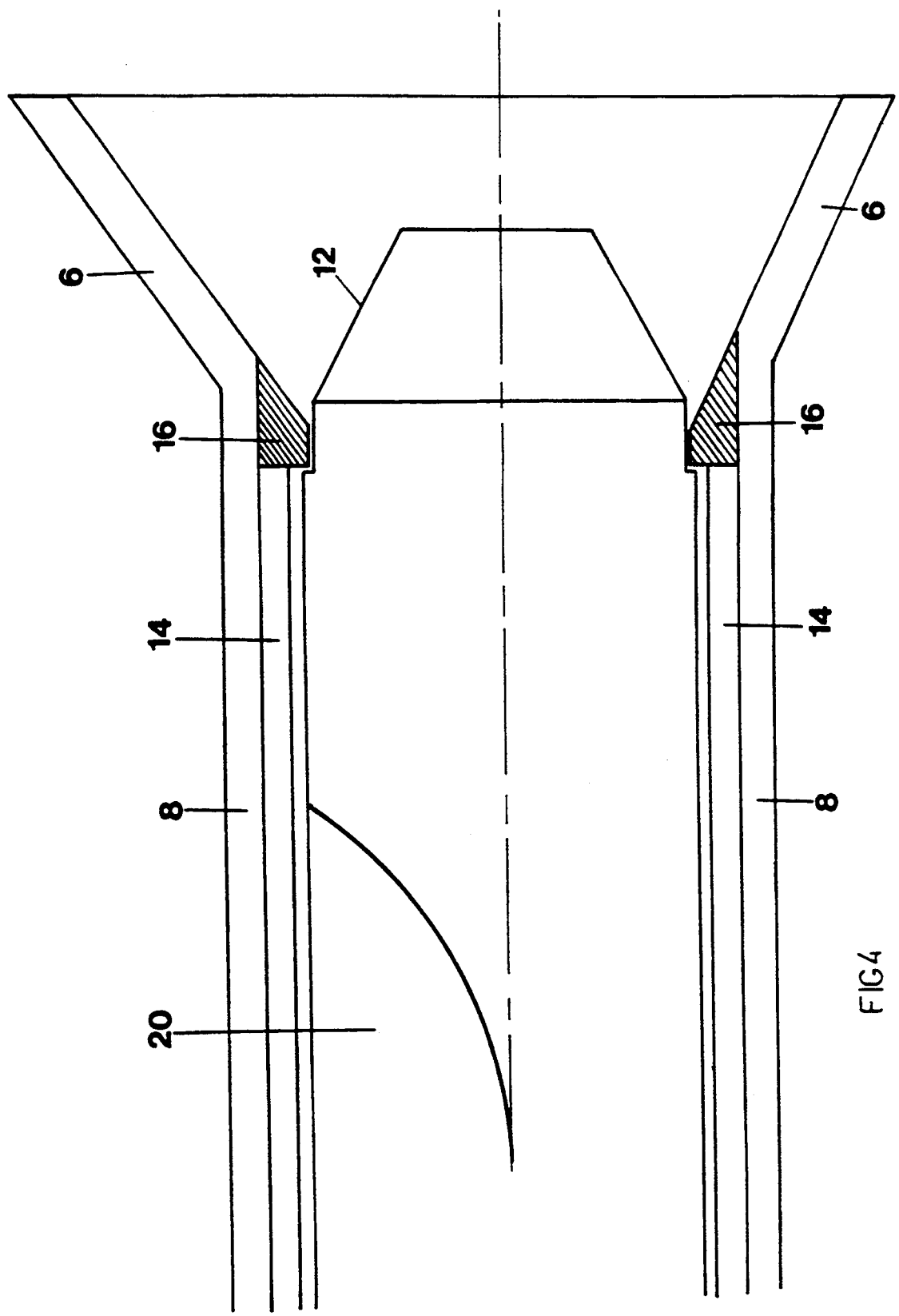
FIG. 4 is an enlarged view of FIG. 2.

As is to be seen from the aforesaid Figures, the guide-post interchanging mechanism worked by remotely operated vehicle, as invented, consists of guide-cones 6, provided in the side of base beam, 2, which supports the guide-post socket, 4. The cones are axially placed and fit all around into the guide-post socket, 4, so as to give rise to an operating channel within such socket, 4, and guide-post, 8, is provided with a channel, 10, around its bottom to house locking-pin, 12. Guide-post, 8, FIG. 2, is so fitted into its respective socket, 4, that the operating channel created by guide cones, 6, inside socket, 4, match channel, 10, FIG. 3, around its bottom, exactly, while locking of guide-post, 8, is achieved by twisting guide-pin, 12, which fits into said channel, 10, around the bottom of guide-post, 8, which is done by a remotely controlled vehicle, or suitable tool. Such locking-pin, 12, lies upon a bearing 14, FIG. 4, made from some non-adhesive material, 14, preferably polytetrafluoroethylene sold under the registered trade mark TEFLON ®, and it has a fastening collar at both its ends that are meant to keep locking-pin, 12, fastened in its proper position.

As is to be seen from FIG. 5, locking-pin, 12, consists of a cylindrical body, 18, with a recess, 20, in the middle of it, which sometimes is inside the channel, 10, running around the guide-post, 8, when the latter is in its locked position, and sometimes is in its unlocked position outside guide-post, 8, plus a working reference (drive coupling), 22, at either end. In FIG. 5 only one end is shown, which by means of an interface enables locking-pin, 12 to be turned with the help of the manipulator, or turning tool.

Figure 7:
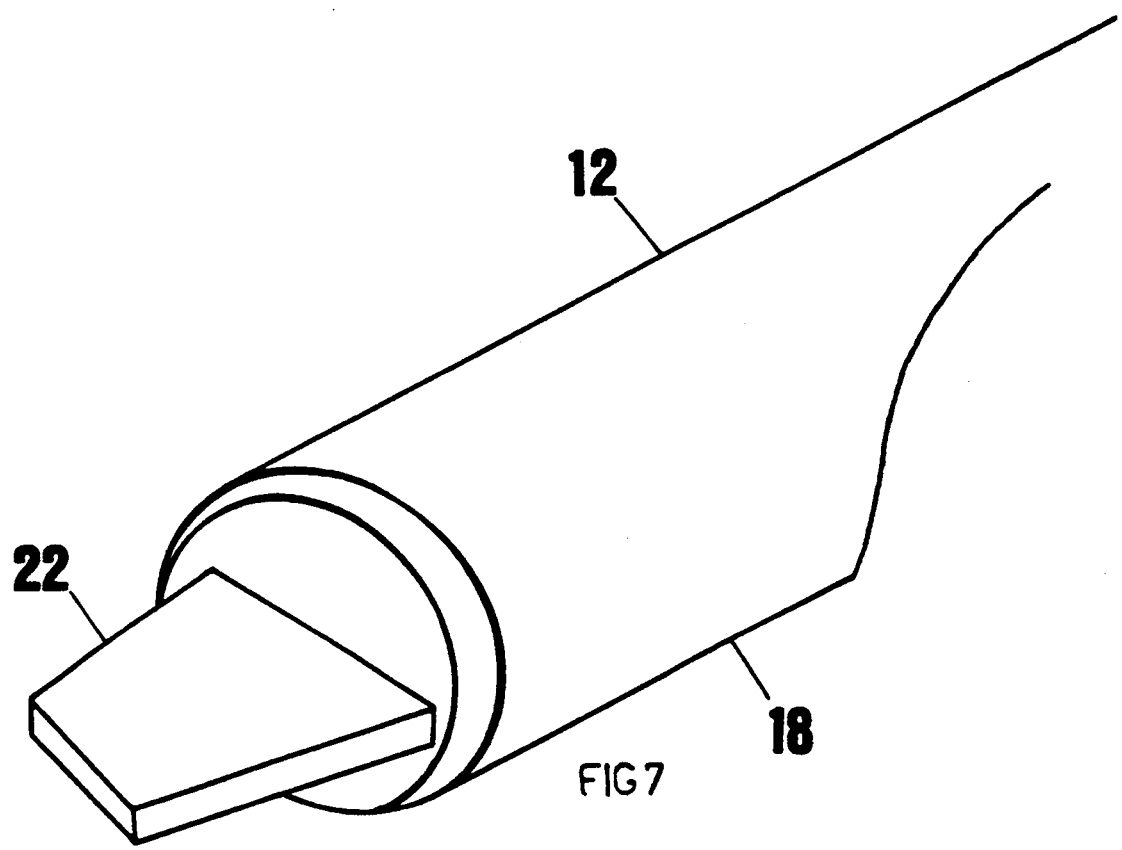
FIG. 7 is a perspective enlarged view of the general kind of proposed operating interface.
Figure 6A:
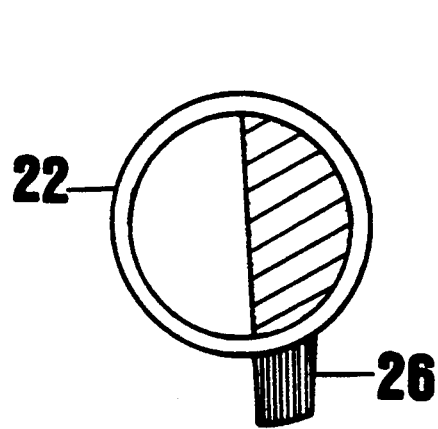
FIGS. 6A, 6B and 6C are front views of operating interfaces with locking dogs and turning stops.
Figure 6B:
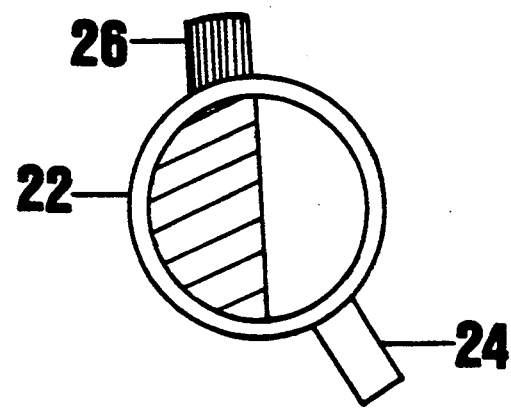
Figure 6C:
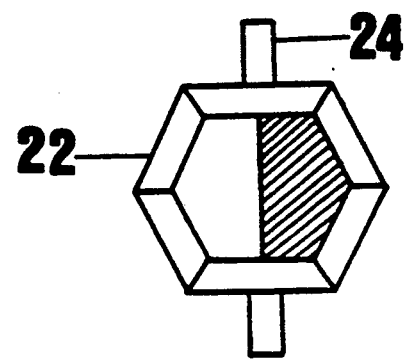

The working reference (drive coupling),22, which makes locking-pin, 12, interface with the manipulator or turning tool (only one end of locking-pin shown in Figures) may be of the six-sided kind, as shown in FIG. 5. Where locking and/or unlocking is done by means of an impact tool coupled to a socket or box type spanner, it may be provided with locking dogs, 24, with turning stops, 26. Action; takes place by simply inserting one or more of the means referred to (manipulator or hydraulic tool) with the R.O.V., while turning about 180°, moving the locking dog, 24, from its blocked position to its other released position. Yet a further alternative would be to provide the working reference (drive coupling), 22, of the general kind (trapezoidal in shape, as shown in FIG. 7) which covers all of the instances of interface at present in use.

The advantages to be gained from such mechanism are obvious, since all of it lies within the base beam protected, and so that the only way of getting at it is by means of manipulators or turning tools, but which can be got at from either side, thus allowing for a choice of action, since if the guide-post is bent to one side and this hinders use of R.O.V., unlocking and later removal can be done from the opposite side.

Mechanism as a whole also has the advantage of not having any moving parts, or outside the mother equipment, there being no need for it to be provided with insertions or any other kind of action by the R.O.V. that might be unsettling or ineffective. All action takes place at the bottom of the guide-post which only needs to be provided with the cable with remote connector from the surface, which is a job that would have to be done whatever the system used for guide-post change.

What is claimed is:

1. A remotely operated mechanism for the interchanging of guide posts by a remotely operated vehicle, said mechanism comprising base beam axially supporting a guide post socket, a guide cone laterally fixed in the side of the base beam and tangential to and entering said guide post socket and creating an operating channel inside the guide post socket, said guide post being provided with a peripheral channel proximate to a bottom of the guide post and said channel axially receiving a locking pin thereby locking the guide post axially within said guide post socket, wherein said guide post socket is provided with two guide cones on opposite sides thereof tangential to the socket and to the guide post when received therein and wherein said guide cones are arranged on opposite sides of said base beam.

2. A remotely operated mechanism for the interchanging of guide posts by a remotely operated vehicle, said mechanism comprising a base beam axially supporting a guide post socket, a guide cone laterally fixed in the side of the base beam and tangential to and entering said guide post socket and creating an operating channel inside the guide post socket, said guide post being provided with a peripheral channel proximate to a bottom of the guide post and said channel axially receiving a locking pin thereby locking the guide post axially within said guide post socket, wherein said guide post fits in the socket such that said operating channel created by said guide cone inside the socket exactly matches the peripheral channel around the bottom of the guide post whereby locking of the guide post into the socket is achieved by rotating the locking pin about an axis thereof when housed in the channel by means of said remotely operated vehicle.

3. A remotely operated mechanism for the interchanging of guide posts by a remotely operated vehicle, said mechanism comprising a base beam axially supporting a guide post socket, a guide cone laterally fixed in the side of the base beam and tangential to and entering said guide post socket and creating an operating channel inside the guide post socket, said guide post being provided with a peripheral channel proximate to a bottom of the guide post and said channel axially receiving a locking pin thereby locking the guide post axially within said guide post socket, wherein said locking pin is seated in a bearing of non-adhesive material provided with an outwardly extending collar at opposite ends to maintain the axial position of the locking pin with respect to the bearing.

4. A remotely operated mechanism for the interchanging of guide posts by a remotely operated vehicle, said mechanism comprising a base beam axially supporting a guide post socket, a guide cone laterally fixed in the side of the base beam and tangential to and entering said guide post socket and creating an operating channel inside the guide post socket, said guide post being provided with a peripheral channel proximate to a bottom of the guide post and said channel axially receiving a locking pin thereby locking the guide post axially within said guide post socket, wherein said locking pin consists of a cylindrical body having at a longitudinal center of the cylindrical body a recess shaped to the outer periphery of the guide post fitted into said socket and said locking pin further comprises at opposite ends a drive coupling member to facilitate rotating of the locking pin with the aid of a manipulator.

5. A mechanism according to claim 4, wherein said drive coupling member which effects an interfacing of the locking in with a manipulator has a hexagonal, tapered configuration.

6. A mechanism according to claim 5, wherein said tapered hexagonal configured drive coupling member is provided with at least one dog and with at least on rotation-limiting stop to limit rotation to approximately 180° during which rotation, said at least one locking dog shifts from a blocked position to a locking pin release position.

7. A mechanism according to claim 4, wherein said drive coupling member is of general trapezoidal shape.

* * * * *